(12) United States Patent
Mandeen et al.

(10) Patent No.: US 12,573,027 B2
(45) Date of Patent: Mar. 10, 2026

(54) EVALUATING A MOBILE DEVICE BASED ON THE DISTANCE BETWEEN THE SCREEN AND THE FRAME

(71) Applicant: Communications Test Design, Inc., West Chester, PA (US)

(72) Inventors: Christopher Mandeen, West Chester, PA (US); Stephen Tate DiJoseph, Downingtown, PA (US)

(73) Assignee: Communications Test Design, Inc., West Chester, PA (US)

( * ) Notice: Subject to any disclaimer, the term of this patent is extended or adjusted under 35 U.S.C. 154(b) by 259 days.

(21) Appl. No.: 18/500,045

(22) Filed: Nov. 1, 2023

(65) Prior Publication Data

US 2025/0139761 A1     May 1, 2025

(51) Int. Cl.
| | |
|---|---|
| *G06T 7/00* | (2017.01) |
| *G01N 21/88* | (2006.01) |
| *G06T 7/70* | (2017.01) |
| *G06V 10/74* | (2022.01) |

(52) U.S. Cl.
CPC ......... *G06T 7/001* (2013.01); *G01N 21/8851* (2013.01); *G06T 7/70* (2017.01); *G06V 10/761* (2022.01); *G01N 2021/8887* (2013.01); *G06T 2207/30121* (2013.01)

(58) Field of Classification Search
CPC ..... G06T 7/0004; G06T 7/0008; G06T 7/001; G06T 7/10–194; G06T 7/70–74; G06T 2207/30121; G06V 10/44; G06V 10/443; G06V 10/74–761; G01N 21/88–8851; G01N 2021/8854–8896
See application file for complete search history.

(56) References Cited

U.S. PATENT DOCUMENTS

| | | | | |
|---|---|---|---|---|
| 10,726,542 B2 * | 7/2020 | Nguyen | .................. | G06T 7/001 |
| 12,013,348 B2 * | 6/2024 | Fitzgerald | .......... | G06Q 30/0283 |
| 12,406,353 B2 * | 9/2025 | DiJoseph | ............... | G06V 10/56 |
| 2018/0365632 A1 | 12/2018 | Enssle et al. | | |
| 2023/0153978 A1 * | 5/2023 | Parsons | ............... | G06V 10/764 |
| | | | | 382/141 |
| 2025/0258056 A1 * | 8/2025 | Elcock | .................... | G01M 3/00 |

FOREIGN PATENT DOCUMENTS

WO     2017192496 A1     11/2017

OTHER PUBLICATIONS

International Search Report and Written Opinion issued for corresponding PCT International Application No. PCT/US2024/010311 dated Jan. 30, 2025, 8 pages.

* cited by examiner

*Primary Examiner* — Scott A Rogers
(74) *Attorney, Agent, or Firm* — Duane Morris LLP

(57)     ABSTRACT

A system of evaluating a mobile device includes an imaging device to capture data taken along an edge of the mobile device; and a processing device to process the data and calculate a difference in distance between a surface of a display and a frame of the mobile device and compare the difference in distance to a predetermined value.

10 Claims, 4 Drawing Sheets

Distance along Edge (mm)

EVALUATING A MOBILE DEVICE BASED ON THE DISTANCE BETWEEN THE SCREEN AND THE FRAME

BACKGROUND

The present disclosure relates to a system and method of evaluating a mobile device. More specifically, the present disclosure relates to using a mechanical dimension between a frame and an electronic display of a mobile device to evaluate the mobile device.

Mobile devices, including tablets, smartphones, smartwatches, etc. have become sophisticated, widespread, and pervasive. With the increasing usage of computer network services all over the world, these mobile devices are in great demand. As a result, the cost of returned, used, and refurbished mobile devices has increased. As with any used mobile device, the mobile device should be evaluated, refurbished, and graded prior to being available in the stream of commerce.

Potential failure mechanisms of mobile devices include problems with the electronic display. Typically, the electronic display in a mobile device is a liquid crystal display (LCD) or an organic light-emitting diode (OLED) display. These display types include several stacked material layers. The material layers can include a separate or integrated touch screen along with the electronic display and an outermost protective layer. The outermost protective layer is typically glass and is used for mechanical and environmental protection and sealing of the electronic display and internal mobile device components.

Besides the obvious problems of cracks, visual impairment, dim and non-uniform lighting, etc., failure mechanisms of electronic displays in mobile devices can include non-obvious delaminating, and mechanical shifting or lifting from the frame that causes an undesired environmental leak to the mobile device interior.

SUMMARY OF THE DISCLOSURE

To overcome the problems described above, embodiments of the present disclosure describe a diagnostic tool for evaluating mobile devices. The disclosed diagnostic tool characterizes the relative position of the electronic display and the frame along an edge of the mobile device and determines if there has been an undesirable physical shift of the electronic display relative to the frame. Such an undesirable shift indicates an environmental seal breach, a mobile device failure mechanism.

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

According to an embodiment, a system of evaluating a mobile device includes an imaging device to capture data taken along an edge of the mobile device; and a processing device to process the data and calculate a difference in distance between a surface of a display and a frame of the mobile device and compare the difference in distance to a predetermined value.

In an aspect, the imaging device is a line scanner.

In an aspect, the line scanner scans an entire edge of the mobile device.

In an aspect, the imaging device captures the data while a conveyor moves the mobile device with respect to the imaging device. The conveyor can include an alignment device to align the mobile device to the imaging device.

In an aspect, the imaging device captures data taken along two edges of the mobile device.

In an aspect, a comparison of the difference in distance to the predetermined value determines if the display has shifted an unacceptable amount with respect to the frame.

In an aspect, a system captures imaging data and processes the imaging data to determine if a display has shifted within a frame of a mobile device.

In an embodiment, a method of evaluating a mobile device includes capturing imaging data and processing the imaging data to determine if a display has shifted within a frame of a mobile device.

In an aspect, a comparison of the distance to the predetermined value indicates if the display has shifted within the frame of the mobile device by an unacceptable amount.

In an aspect, a result of processing the imaging data is displayed on a processing device.

In an embodiment, a non-transitory computer-readable medium including executable instructions that when executed by a processor cause the processor to capturing imaging data and process the imaging data to determine if a display has shifted within a frame of a mobile device.

The above and other features, elements, characteristics, steps, and advantages of the present invention will become more apparent from the following detailed description of preferred embodiments of the present invention with reference to the attached drawings.

DETAILED DESCRIPTION

Figure 1:
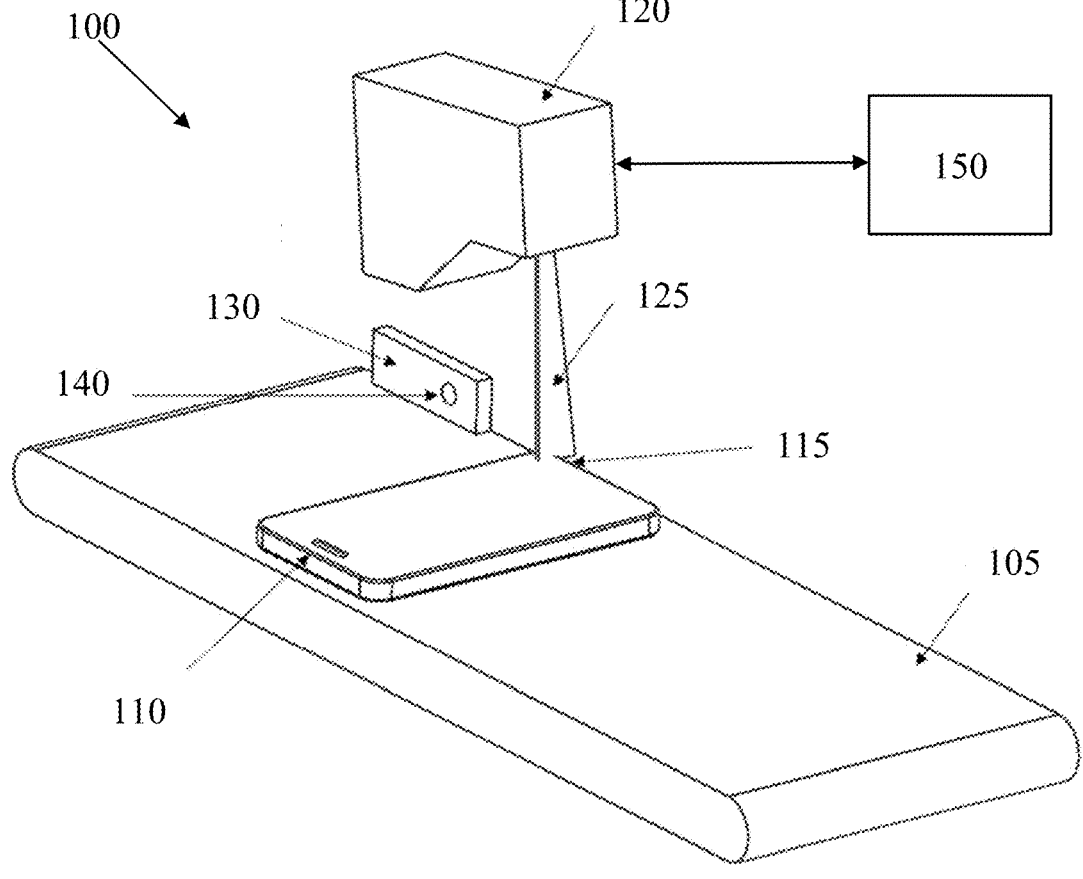
FIG. 1 is a diagram of a system, according to an embodiment of the present disclosure.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Electronic displays of mobile devices are sealed in their frame or housing during manufacture. The seal is provided completely around the outside perimeter of the electronic display in an area where the electronic display meets the frame. This seal between the electronic display and the frame provides environmental integrity in that it prevents air and liquids from migrating between the ambient environment and the inside of the mobile device, which includes the battery and electronic components, around the perimeter of the electronic display. Undesirable air or liquid migration can allow moisture and other contaminates to penetrate the inside of the mobile device and cause or contribute to failures of the battery, electronics, or internal wiring.

It has been found that electronic displays in mobile devices can physically shift from their manufactured position in their frame during handling and use. This physical shift can be caused by exposure to shock, vibration, temperature changes, other environmental factors, or a combination of such environments. Such a shift can weaken and/or break the environmental seal between the electronic display and the frame to allow air migration and/or liquid penetration into the mobile device, which is a failure mode.

The present disclosure describes a diagnostic tool for evaluating mobile devices. The disclosed diagnostic tool characterizes the relative position of the electronic display and the frame along an edge of the mobile device and determines if there has been an undesirable physical shift of the electronic display relative to the frame. Such an undesirable shift indicates an environmental seal breach, a mobile device failure mechanism.

The disclosed tool measures, from a reference point, a distance to the frame of the mobile device and a distance to an outer surface of the electronic display along the frame. The tool measures these distances along an entire edge or edges of the mobile device and calculates a difference between these distances along the edge. The difference along the edge is compared to a threshold value, predetermined by experimentation, to determine if the electronic display has physically shifted enough relative to the frame to breach the environmental seal and cause a mobile device failure. A maximum, minimum, or overall relative physical profile can be reviewed. With that information, it can be determined if the electronic display has a problem such as delaminating, lifting from the frame, or leaking.

Data gathered by the disclosed diagnostic tool can be used to determine if a mobile device has failed, is predicted to fail, provide a relative 'strength' rating, or provide an indication of what is failing about the mobile device. Additionally, data can be used to determine what processes or treatments are effective in repairing mobile devices, i.e., a significant physical shift could indicate that a sealing repair treatment would not be successful.

FIG. 1 illustrates an exemplary system 100 for evaluating a mobile device 110, according to an embodiment of the present disclosure. As shown, the system 100 can include a conveyor 105 that moves the mobile device 110 at a constant speed relative to a line scanner 120 of a scanning imaging system. The line scanner 120 measures a distance to portions of the mobile device such as the electronic display and the frame with high accuracy and tolerance.

As shown, the conveyor 105 can be driven belt. Alternatively, the conveyor 105 can be a mechanical table, roller, robot arm, or any suitable conveying mechanism. In another aspect, the mobile device 110 is maintained as stationary and the line scanner 120 is moved with respect to the mobile device 110. In another aspect, the mobile device 110 and the line scanner 120 are both simultaneously moved with respect to each other. In another aspect, a line scanner with a larger line projection can be used where the mobile device 110 and the line scanner 120 do not need to be moved with respect to each other.

The scanning imaging system can include the line scanner 120 and an interface to a computer system 150. The line scanner 120 of the scanning imaging system can continuously capture images of a line projection 125 projected perpendicular to an edge 115 as the mobile device 110 passes through the line projection 125. Data gathered during the line of the edge of the mobile device 110 can be stored in a memory of the computer system 150 and used to determine distances between the electronic display and the frame of the mobile device 110. Alternatively, in another aspect, although the system 100 is shown with one line scanner 120, two line scanners 120 can be used, one each to scan opposite edges of the mobile device 110. Scanning opposite edges of the mobile device 110 can be performed simultaneously or alternately. Alternatively, in other aspects, a digital camera or profilometer can be used in lieu of the line scanner 120.

The line projection 125 can be any suitable length. In an embodiment, the line projection 125 can be can be from 10 mm to 20 mm long, within tolerances. In another embodiment, the line projection 125 can be can be 15 mm long, within tolerance.

The system 100 can also include fixturing such as an edge positioner 130 to orient the mobile device 110 on the conveyor 105 with respect to the line scanner 120. A photo eye or photo sensor 140 can also be included to sense placement or movement of the mobile device 110 during measurement.

The computer system 150 can include known computing components, such as one or more processors, one or more memory devices storing software instructions executed by the processor(s), an operator interface including a keyboard, mouse, and monitor, and data stored in a memory. Stored software instructions can include a program or an application for operating the system along with a graphic user interface (GUI) to assist an operator. The one or more processors can be a single microprocessor or multiple microprocessors, field programmable gate arrays (FPGAs), digital signal processors (DSPs), or any suitable combination of these or other components capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), a semiconductor memory, or the cloud. The computer system 140 can include a server or network of computers. The computer system 140 can include an output device such as a printer.

The computer system 150 can include an application programmed to capture, store, process, and display raw and/or processed data from the line scanner 120. The computer system 150 can display data in numerical or graphical form, or more simply indicate pass/fail of the measurement. The computer system 150 can be programmed to capture data representing distance from the line scanner 120 to the mobile device 110 along the edge 115 of the mobile device 110. Within the line projection 125, there is a plateau for the display, a valley between the display and frame, a shorter plateau for the frame, and a drop off after the edge 115 of the mobile device 110. The computer system 150 can be programmed to determine where the plateaus are for the display and frame.

For the frame, the line scanner 120 can be started on one side, for example outside of the mobile device 110, scan toward the inside until the computer system 150 detects a rise in signal at the edge 115 of the mobile device 110 onto the frame, and a drop in signal at the gap between the frame and the display. The computer system 150 can then perform a scan offset, e.g. about 1 mm to the outside, so the scan projection 125 is located from about 1 mm onto the frame from the display side edge of the frame.

For the display, the line scanner 120 can be started on one side, for example outside of the mobile device 110, scan toward the inside until the computer system 150 detects a rise in signal at the edge 115 of the mobile device 110, a drop in signal at the gap between the frame and display and then another rise (start of the display). The computer system 150 can then perform a scan offset, e.g. about 1 mm to the inside, so the scan projection 125 is located from about 1 mm onto the display from the frame side edge of the display.

The captured data can be stored in a record in the computer system 150 representing the unique individual mobile device 110 being measured. The computer system 150 can process the captured data to determine a distance between an outer surface of the display and the frame of the mobile device 110, as discussed in greater detail below with respect to FIG. 3. The computer system 150 can compare the distance between an outer surface of the display and the frame of the mobile device 110 to a predetermined value or threshold. The predetermined value can be different for different models of mobile devices. The computer system 150 can indicate the result of that comparison. The indication of the result can be visual and/or audible.

Figure 2:
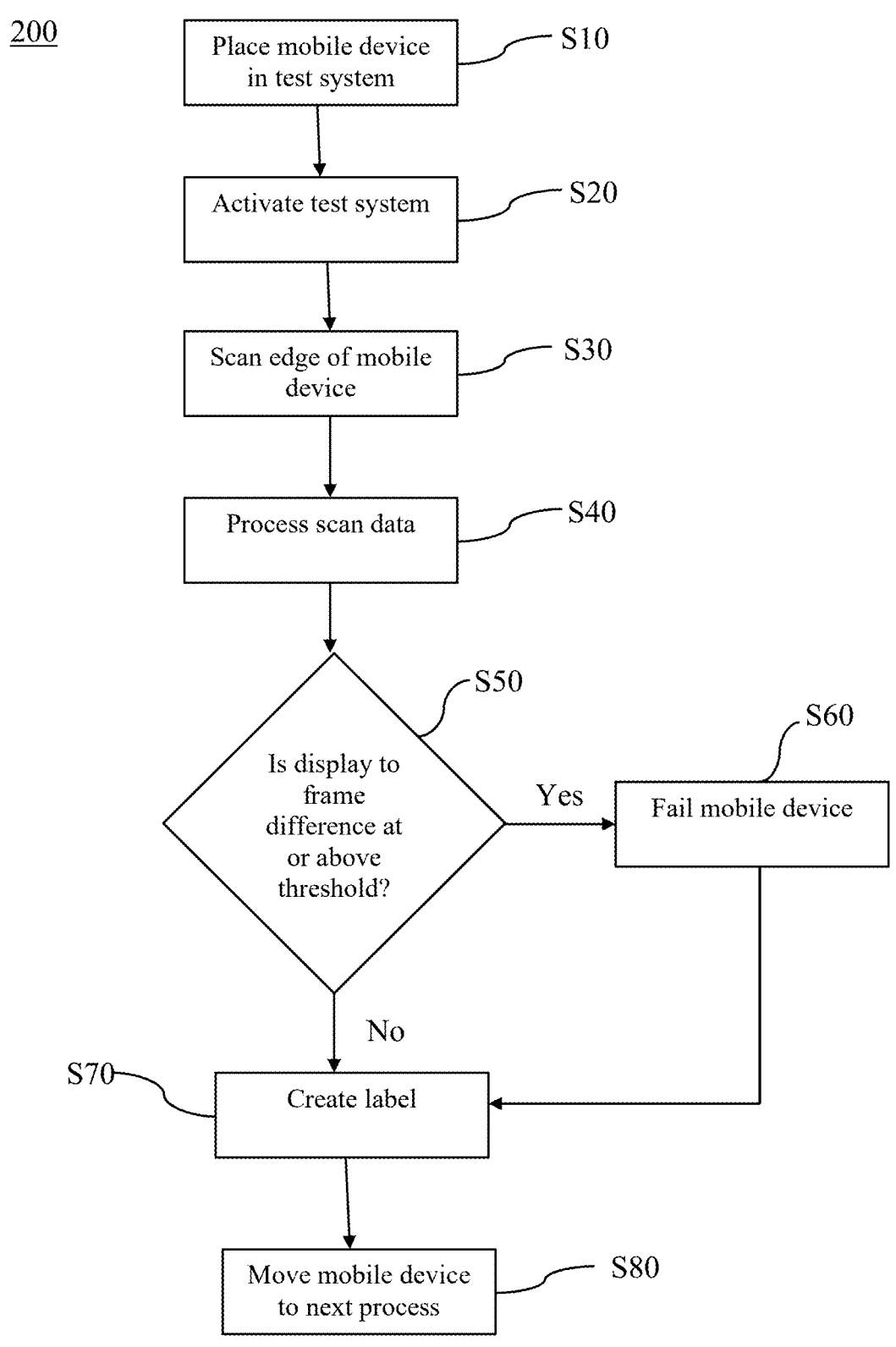
FIG. 2 is a flow chart of a method, according to an embodiment of the present disclosure.

FIG. 2 is a flowchart of a method 200 of evaluating a mobile device, according to an embodiment of the present disclosure.

In step S10, a mobile device is placed in a test system. The test system can be like that shown and described with respect to FIG. 1. If that is the case, the mobile device 110 can be placed display side up on the conveyor 105 with the edge 115 of the mobile device 110 placed against the edge positioner 130.

In step S20, the test system is activated to scan an edge of the mobile device with a line scanning imaging system. Activating the test system can include initiating movement of the mobile device with respect to a line scanner of the line scanning imaging system and turning on and off the line scanner. For example, activating the test system can include turning on a conveyor to move the mobile device under a line projection of a line scanner of the line scanning imaging system. A photo sensor can be used to trigger the line scanner such that the photo sensor detects when the mobile device passes to turn on the line scanner. If the conveyor is already running when the mobile device is placed on the conveyor in step S10, movement of the mobile device passed the photo sensor can active the test system. Alternatively, activating the test system can be performed by an operator who presses a physical or virtual 'start' button via a computer interface.

In step S30, the front surface along an edge of the mobile device is scanned by a line scanner as the mobile device and the line scanner are moved with respect to each other. The length of the line projection from the line scanner and relative position of the mobile device to the line projection is such that the line projection will project across the front surface of the frame of the mobile device and a portion of the electronic display adjacent to the frame. The scanning captures data representing a distance from the line scanner to the features of the front surface of the mobile device along the line projection. Alternatively, two parallel edges of the mobile device can be scanned. This can be accomplished with one line scanner with a line projection having a length long enough cover both edges or with two separate line scanners, one for each edge.

In step S40, the scan data captured during the line scan is processed by a computer system. Processing the data can include calculating a distance between the front surface of the display and the front surface of the frame and comparing that distance to a predetermined value or threshold recipe.

Figure 3:
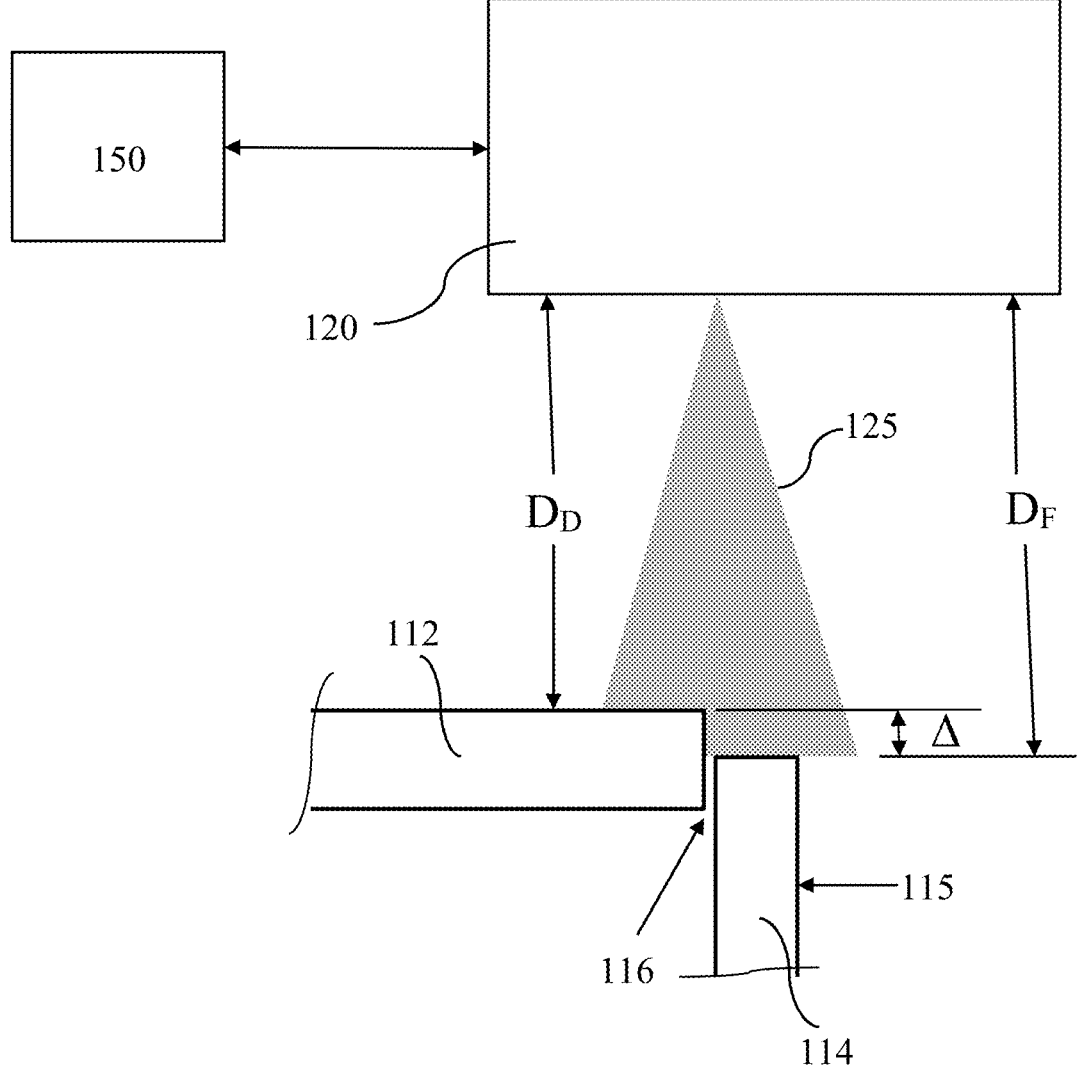
FIG. 3 schematically depicts the line scanning and data to be processed.

FIG. 3 schematically depicts the line scanning and data to be processed. FIG. 3 shows the line scanner 120 and the line projection 125 projecting to a section view of an edge of the mobile device that includes the display 112 and the frame 114. The side of the frame 115 is shown for orientation and a gap 116 is represented as the seal area between the display 112 and the frame 114. A distance from the line scanner 120 to the display 112 is shown as $D_D$ and a distance from the line scanner 120 to the frame 114 is shown as $D_F$. The computer system determines the distances $D_D$ and $D_F$ from the captured scan data. As part of programming a method for a particular mobile device model to be scanned, the line scanner 120 is instructed that the display surface in the middle is flat and at zero. As a result, the edge of the display 112 is very close to zero, and the edge of the frame 114 is a small negative number. The computer system 150 confirms this by point by point math. Once the distances $D_D$ and $D_F$ are determined, the computer system 150 calculates the difference $\Delta$(delta). That is: $D_F - D_D = \Delta$(delta). The value $\Delta$ (delta) is then compared to the predetermined value in step S40.

In step S50, it is determined if the distance between the display 112 and the frame 114 (i.e., $\Delta$, delta) is above the threshold. A value of $\Delta$(delta) at or above the threshold indicates that the display 112 has unacceptably physically shifted with respect to the frame 114, YES in step S50. In which case, the computer system can indicate or an operator can determine that the mobile device has failed the evaluation in step S60. The mobile device can be set aside for more detailed evaluation or scrapped. A value of $\Delta$ (delta) below the threshold indicates that any physical shift of the display 112 with respect to the frame 114 is acceptable, NO in step S50. In which case, the computer system can indicate or an operator can determine that the mobile device has passed the evaluation.

In step 70, a virtual or physical label or tag can be created indicating the results of the evaluation. The label can become part of a digital record for the individual mobile device and stored in the computer system. Optionally, the label can be printed and accompany the mobile device.

In step 80, the mobile device can be moved to a next process based on the results of the evaluation.

Figure 4:
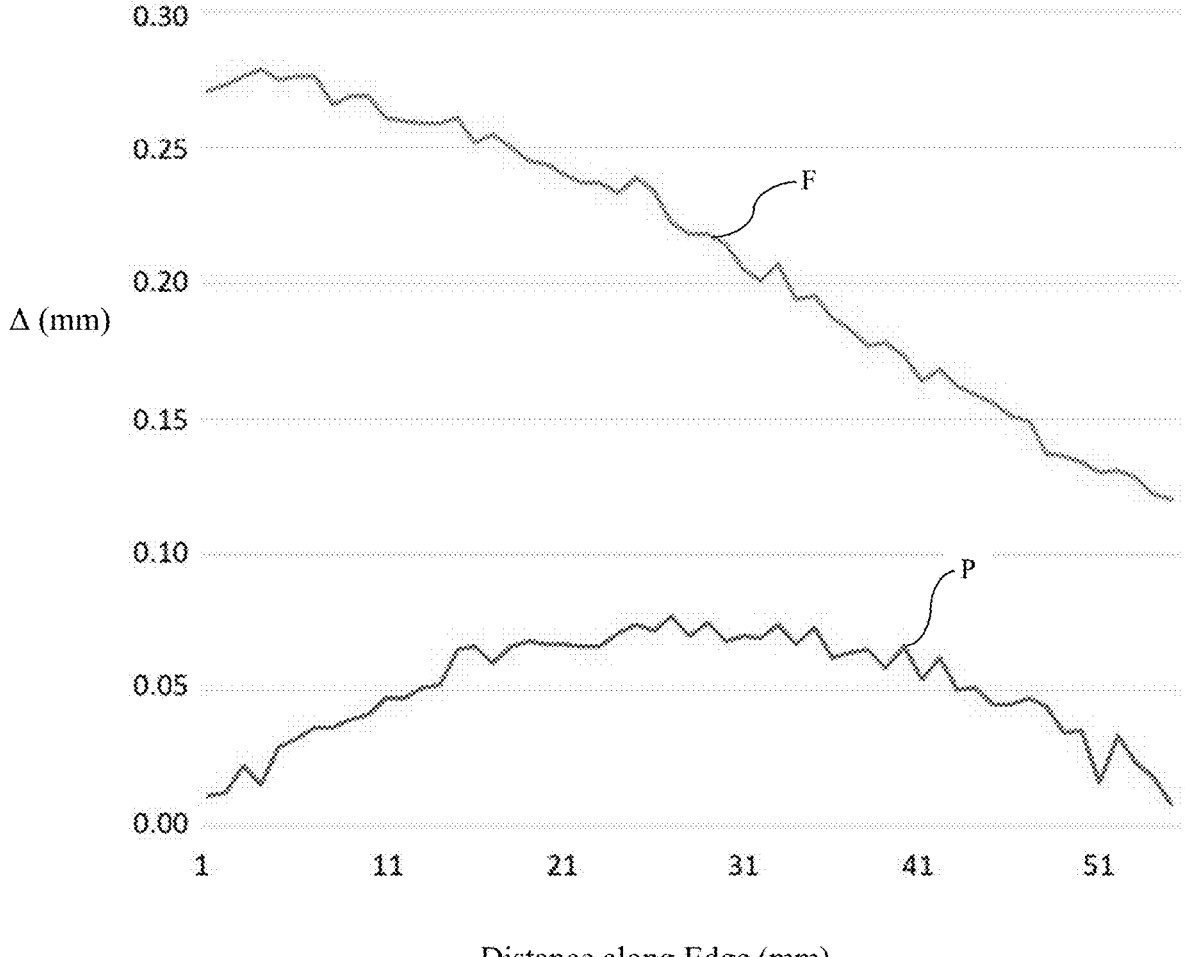
FIG. 4 is a graph showing examples of processed scan data.

FIG. 4 is a graph showing examples of processed scan data. The graph of FIG. 7 plots distance between the front surfaces of the frame and display (i.e., $\Delta$) versus the distance along the edge of the mobile device. As shown, the physical shift in the top profile F starts at a high point, in a corner of the mobile device, and drops along the edge. The high point is at over 0.25 mm and indicates that the display has shifted with respect to the frame an unacceptable amount for the high point and the relative difference between one corner of the mobile device and another corner along the measured edge. This is a common profile that indicates the mobile device has failed the evaluation.

The bottom profile P, in FIG. 4, is low on the left and right but rises in the middle. This is a more common profile for mobile devices. The highest difference between the front surface of the frame and the display is less than 0.1 mm. This indicates that the mobile device has passed the evaluation.

The above-described embodiments of the present disclosure can be implemented in any of numerous ways. For example, the embodiments can be implemented using hardware, software, or a combination thereof. When implemented in software, the software code can be executed on any suitable computer, processor, or collection of processors, whether provided in a single computer or distributed among multiple computers. Such processors can be implemented as integrated circuits, with one or more processors in an integrated circuit component. Though, a processor can be implemented using circuitry in any suitable format.

Additionally, or alternatively, the above-described embodiments can be implemented as a non-transitory computer readable storage medium embodied thereon a program executable by a processor that performs a method of various embodiments.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically, the functionality of the program modules can be combined or distributed as desired in various embodiments.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method of evaluating a mobile device comprising:
  capturing imaging data and processing the imaging data to determine if a display has shifted within a frame of a mobile device;
  wherein the processing the image data includes determining a distance between front surfaces of the display and the frame.

2. The method of claim 1, wherein capturing the imaging data is performed by a line scanner.

3. The method of claim 2, wherein the line scanner scans an edge of the mobile device to capture the imaging data.

4. The method of claim 3, wherein the line scanner scans two edges of the mobile device to capture the imaging data.

5. The method of claim 1, wherein the processing the image data further includes comparing the distance to a predetermined value.

6. The method of claim 5, wherein a comparison of the distance to the predetermined value indicates if the display has shifted within the frame of the mobile device by an unacceptable amount.

7. The method of claim 1, wherein a result of processing the imaging data is displayed on a processing device.

8. A non-transitory computer-readable medium including executable instructions that when executed by a processor cause the processor to capturing imaging data and process the imaging data to determine if a display has shifted within a frame of a mobile device;
  wherein processing the image data includes determining a distance between front surfaces of the display and the frame.

9. The non-transitory computer-readable medium of claim 8, wherein the imaging data is captured from a line scanner.

10. The non-transitory computer-readable medium of claim 8, wherein the processing the image data further includes comparing the distance to a predetermined value.

* * * * *